US010315230B2

(12) United States Patent
Pollard et al.

(10) Patent No.: US 10,315,230 B2
(45) Date of Patent: *Jun. 11, 2019

(54) SMARTCARD CLEANING AND SORTING SYSTEMS AND METHODS

(71) Applicant: DISH Network L.L.C., Englewood, CO (US)

(72) Inventors: Jimmy A. Pollard, Boiling Springs, SC (US); Zachary S. Morrison, Greer, SC (US); Aldo Alvidrez, El Paso, TX (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,734

(22) Filed: Jul. 30, 2018

(65) Prior Publication Data

US 2019/0054504 A1 Feb. 21, 2019

Related U.S. Application Data

(63) Continuation of application No. 15/680,479, filed on Aug. 18, 2017, now Pat. No. 10,065,216.

(51) Int. Cl.
| *G06F 17/00* | (2019.01) |
| *G06F 19/00* | (2018.01) |
| *B07C 5/34* | (2006.01) |
| *B08B 1/02* | (2006.01) |
| *B07C 5/02* | (2006.01) |
| *B08B 1/04* | (2006.01) |
| *B08B 3/08* | (2006.01) |
| *B08B 1/00* | (2006.01) |

(Continued)

(52) U.S. Cl.
CPC .............. *B07C 5/3412* (2013.01); *B07C 5/02* (2013.01); *B07C 5/3422* (2013.01); *B08B 1/002* (2013.01); *B08B 1/02* (2013.01); *B08B 1/04* (2013.01); *B08B 3/08* (2013.01); *G06K 7/1439* (2013.01); *G06K 19/042* (2013.01); *G06K 19/045* (2013.01)

(58) Field of Classification Search
USPC ....................................................... 235/375
See application file for complete search history.

(56) References Cited

U.S. PATENT DOCUMENTS 5,714,743 A 2/1998 Chiba et al.
6,308,886 B1 * 10/2001 Benson .................. G06K 17/00
235/375

(Continued)

OTHER PUBLICATIONS

U.S. Appl. No. 15/680,479, filed Aug. 18, 2017, Notice of Allowance dated May 10, 2018, all pages.

*Primary Examiner* — Tuyen K Vo
(74) *Attorney, Agent, or Firm* — Kilpatrick Townsend & Stockton LLP

(57) ABSTRACT

Various arrangements are presented for cleaning and sorting smartcards. An identifier present on the exterior of the smartcard may be scanned. A smartcard may be dispensed from an intake magazine that housing a plurality of smartcards. The smartcard may be moved along a cleaning assembly. The contacts of the smartcard may be cleaned. The contacts of the smartcard may be dried. After cleaning and drying the contacts of the smartcard, the smartcard may be sorted into either a cleaned output magazine or a cleaned rejection tray based on whether the scanning of the identifier was successfully performed.

20 Claims, 14 Drawing Sheets

(51) Int. Cl.
*G06K 7/14* (2006.01)
*G06K 19/04* (2006.01)
*B07C 5/342* (2006.01)

(56) References Cited

U.S. PATENT DOCUMENTS

| | | | |
|---|---|---|---|
| 6,611,985 B1 * | 9/2003 | Neubauer | G06K 19/02 |
| | | | 15/210.1 |
| 10,065,216 B1 | 9/2018 | Pollard et al. | |
| 2004/0164150 A1 | 8/2004 | Mori | |
| 2009/0045255 A1 | 2/2009 | Adams | |

* cited by examiner

SMARTCARD CLEANING AND SORTING SYSTEMS AND METHODS

BACKGROUND

Smartcards can provide a high level of security and are used in various ways, including managing decryption at television receivers. When a customer returns a television receiver to a service provider, the television receiver and/or the smartcard may be serviced and distributed to another customer. As part of the servicing of the television receiver, a smartcard present in the television receiver may be serviced to ensure proper functionality. This smartcard may be reused in the same or a different television receiver.

SUMMARY

Various embodiments are described related to a smartcard cleaning and sorting apparatus. In some embodiments, a device for a smartcard cleaning and sorting apparatus is described. The device may include a housing. The device may include an uncleaned intake magazine for housing a plurality of smartcards that dispenses each smartcard of a plurality of smartcards individually. The device may include the uncleaned intake magazine coupled with the housing. Each smartcard may comprise: a plurality of external metallic contacts in communication with an on-board integrated circuit and a machine-readable identifier. The device may include an identifier scanner attached with the housing that attempts to read a machine-readable identifier of each smartcard of the plurality of smartcards after each smartcard has been dispensed from the uncleaned intake magazine. The device may include a cleaning assembly, coupled with the housing, comprising a plurality of brushes and a plurality of liquid sprayers that cleans a plurality of external metallic contacts of each smartcard regardless of whether the identifier scanner successfully read the machine-readable identifier of the smartcard. The device may include a sorting assembly, coupled with the housing, that receives the plurality of smartcards following each smartcard of the plurality of smartcards passing through the cleaning assembly and sorts each smartcard of the plurality of smartcards based on whether the identifier scanner successfully read the machine-readable identifier of the smartcard. The device may include a cleaned output magazine, coupled with the housing, that receives and stores at least a subset of the plurality of smartcards received from the sorting assembly. Each smartcard of the at least the subset of the plurality of smartcards may have the machine-readable identifier of the smartcard successfully scanned by the identifier scanner prior to passing through the cleaning assembly.

Embodiments of such a device may include one or more of the following features: a roller assembly comprising a plurality of rollers. A first subset of a plurality of rollers may contact a first side of smartcards passing through the cleaning assembly and a second subset of the plurality of rollers contact a second side of a smartcards passing through the cleaning assembly. The device may include a drive system. The drive system may cause at least some of the plurality of rollers to turn to advance the plurality of smartcards through the cleaning assembly. The drive system may include a roller chain that mechanically connects the at least some of the plurality of rollers with a drive assembly. The roller assembly may include a plurality of tensioning springs. Each tensioning spring of the plurality of tensioning springs may have an adjustable tension controlling pressure of a roller of the plurality of rollers on the plurality of smartcards as each smartcard passes through the cleaning assembly. The plurality of liquid sprays may spray alcohol on one or more brushes of the plurality of brushes. The identifier scanner may be an optical scanner that attempts to read a barcode from each smartcard of the plurality of smartcards. The device may include a computerized user interface device in communication with the identifier scanner. The device may output indications of the machine-readable identifiers successfully scanned by the identifier scanner. The device may include a cleaned reject tray, coupled with the housing, that receives and stores at least a second subset of the plurality of smartcards received from the sorting assembly. Each smartcard of the at least the second subset of the plurality of smartcards may have the machine-readable identifier of the smartcard unsuccessfully scanned by the identifier scanner prior to passing through the cleaning assembly. The housing may include a housing lock and the smartcard cleaning and sorting apparatus only cleans and sorts the plurality of smartcards when the housing is closed and locked.

In some embodiments, a method for cleaning and sorting smartcards is described. The method may include scanning an identifier present on an exterior of the smartcard. The identifier may be a machine-readable code and scanning may be performed prior to cleaning contacts of the smartcard. The method may include dispensing a smartcard from an intake magazine that housing a plurality of smartcards. The method may include, after scanning the identifier and dispensing the smartcard, moving the smartcard along a cleaning assembly. The method may include cleaning the contacts of the smartcard by a cleaning assembly. The method may include drying a contacts of the smartcard. The method may include, after cleaning and drying the contacts of the smartcard, sorting the smartcard into either a cleaned output magazine or a cleaned rejection tray based on whether the scanning of the identifier was successfully performed prior to moving the smartcard along the cleaning assembly.

Embodiments of such a method may include one or more of the following features: altering a position of the cleaned output magazine based on the smartcard being successfully scanned. A distance that the position of the cleaned output magazine is altered may be based on the identifier of the smartcard. Cleaning the contact of the smartcard may comprise brushing both sides of the smartcard by a smartcard processing apparatus. Moving the smartcard along the cleaning assembly may be performed by a roller assembly that is driven by a drive motor. The roller assembly comprises a plurality of tension springs that may cause rollers of the roller assembly to exert force on the smartcard. The method may include dispensing a second smartcard from the intake magazine that houses a plurality of smartcards in response to the smartcard being sensed by a card sensor of a smartcard processing apparatus. Scanning the identifier may comprise scanning a barcode of the smartcard using an optical scanner.

In some embodiments, a device for a smartcard cleaning and sorting apparatus is described. The device may include an intake means for housing a plurality of smartcards that dispenses each smartcard of the plurality of smartcards individually. The device may include an identifier scanning means that attempts to read a machine-readable identifier of each smartcard of the plurality of smartcards after each smartcard has been dispensed from the intake means. The device may include a cleaning means, comprising a plurality of brushes that cleans each smartcard regardless of whether the identifier scanning means successfully read a machine-readable identifier of the smartcard. The device may include a sorting means that receives the plurality of smartcards following each smartcard of the plurality of smartcards passing through the cleaning means and sorts each smartcard of the plurality of smartcards based on whether the identifier scanning means successfully read the machine-readable identifier of the smartcard. The device may include an output means that receives and stores at least a subset of the plurality of smartcards received from the sorting means. Each smartcard of the at least the subset of the plurality of smartcards may have a machine-readable identifier of the smartcard successfully scanned by the identifier scanning means prior to passing through the cleaning means. The device may include a conveyor means that causes the smartcard to pass from the identifier scanning means, through the cleaning means, to the sorting means.

DETAILED DESCRIPTION

Figure 1:
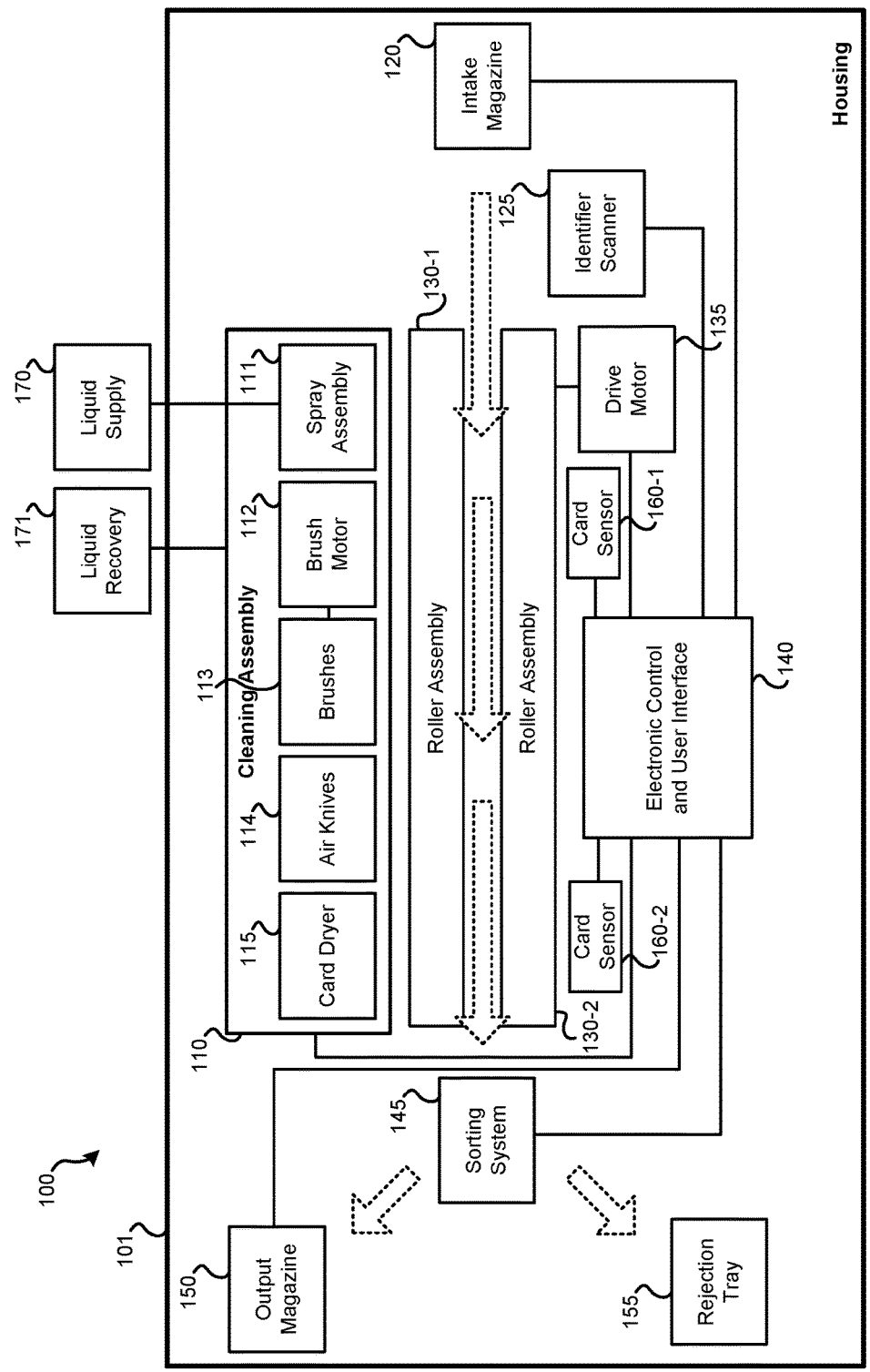
FIG. 1 illustrates an embodiment of a block diagram of a smartcard cleaning and sorting system.

In certain circumstances, a large number of smartcards may need to be cleaned and, possibly, sorted. As an example, various types of television receivers, which include set top boxes (STBs), may have removable smartcards that are used to perform decryption of data packets received via a television programming distribution network. A television service provider may transmit, such as wirelessly via satellite, television programming that uses encrypted keys, referred to as entitlement control messages (ECMs), in order to obtain control words (CWs), which are, in turn, used for descrambling audio and video content of television programming. A smartcard installed within the television receiver may decrypt the ECMs to obtain CWs. By isolating decryption of the ECMs in the smartcard, the service provider may be able to tightly control security around who has access to the decryption algorithm and decrypted ECMs.

When a television receiver is returned to a service provider, such as after a subscriber has ended his subscription or upgraded to a new television receiver, the smartcard present within the television receiver may still be viable for redeployment in the same or another television receiver to perform decryption duties. Rather than discarding or destroying the smartcard, the smartcard may be cleaned to ensure it is in a condition suitable for redeployment.

A smartcard cleaning and sorting apparatus (referred to as a "smartcard processing apparatus" for short), may read an identifier in the form of a machine-readable code from an exterior of the smartcard, such as a barcode. This barcode may be scanned to determine the identifier of the smartcard. Regardless of whether the barcode is successfully read or not, the smartcard may proceed through a cleaning apparatus. The cleaning apparatus may spray one or more brushes and/or the smartcards with a liquid, such as alcohol, and brush the contacts of the smartcard (and, possibly, at least a portion of the remainder of the top and bottom sides of the smartcard). In some embodiments, a top brush and a bottom brush is sprayed with alcohol. The top brush then brushes a top of a smartcard and the bottom brush then brushes a bottom of the smartcard. The smartcards may then be dried via blowing air. Each smartcard may then be sorted based on the previous scanning of the identifier.

If the identifier was successfully read, the smartcard may be sorted into a cleaned output magazine. Each smartcard loaded into this magazine may have its identifier recorded to a database or other storage arrangement of the smartcard processing apparatus. If the identifier was not successfully read, such as due to dirt or damage to the smartcard, the smartcard may still be cleaned, but may be loaded into a separate reject tray or magazine. This reject tray or magazine stores smartcards that were cleaned but not successfully scanned. Each of these smartcard may be reprocessed, scanned manually, or discarded.

While the above description outlines how the smartcard processing apparatus may be used in relation to a television service provider's system, it should be understood that smartcards that are put to other uses may also benefit from such a cleaning and sorting arrangement. For example, smartcards may be used for conducting financial transactions. Such smartcards may benefit from being cleaned and, possibly, sorted in certain situations. Other uses are also possible, such as for cleaning transaction cards (e.g., financial transaction cards) that have a magnetic stripe (in addition to or in alternate to a chip).

Further detail regarding the smartcard processing apparatus is provided in relation to the figures. FIG. 1 illustrates an embodiment of a block diagram of smartcard cleaning and sorting system 100. The smartcard processing apparatus may include: cleaning assembly 110, intake magazine 120, identifier scanner 125, roller assemblies 130, drive motor 135, electronic control and user interface 140, sorting system 145, output magazine 150, rejection tray 155, and card sensors 160. The smartcard processing apparatus may include a housing which serves as the structure for the apparatus upon which various components are either permanently or removably attached. Housing 101 may be a metal frame or some other rigid material. All components of system 100 may be removably or permanently attached with housing 101.

Smartcards that are yet to be processed may be loaded into intake magazine 120. Intake magazine 120 may be configured and sized in order to receive a significant number of smartcards, such as 250. In other embodiments, intake magazine 120 may accommodate between, for example, 5 and 5,000 smartcards. The smartcards loaded into intake magazine 120 may be of varying thicknesses. Therefore, each smartcard within intake magazine 120 may not be the same thickness. Intake magazine 120 may be removably attached with housing 101. Therefore, in order to ease insertion of the smartcards into intake magazine 120, intake magazine 120 may be detached from housing 101. Intake magazine 120 may dispense smartcards one at a time to be read by identifier scanner 125.

As each smartcard is dispensed from intake magazine 120, identifier scanner 125 may attempt to scan an identifier present on an exterior of the smartcard. Identifier scanner 125 may be an optical scanner and may read barcodes. Therefore, present on each smartcard may be a barcode that identifier scanner 125 attempts to read. Rather than a barcode, other forms of machine-readable identifiers may be used, such as an RFID tag, alphanumeric code, color-coded symbol, QR-code, etc. The type of identifier scanner 125 selected can be based on the type of machine-readable code to be read. If identifier scanner 125 successfully reads the identifier present on the smartcard, the identifier read may be transmitted to electronic control and user interface 140 for logging and storage. If the identifier is not successfully read, an indication that the identifier was not read may be transmitted to electronic control and user interface 140. Regardless of whether the identifier was properly read, the smartcard may be passed into roller assemblies 130.

Roller assemblies 130 (130-1 and 130-2), may use a series of rollers to advance each smartcard along a defined path. Roller assembly 130-1 may be a series of rollers beneath which each smartcard passes. Roller assembly 130-2 may be a series of rollers upon which each smartcard rests. The rollers of roller assemblies 130-2 may be connected with drive motor 135. Drive motor 135, when engaged, may cause rollers of roller assembly 130-2 to rotate and advance each smartcard from intake magazine 120 towards sorting system 145. Drive motor 135 may be connected with some or all of the rollers of roller assembly 130-2 via a drive chain or drive belt. Downward pressure may be applied by the rollers of roller assembly 130-1 such that sufficient friction is present between the rollers of roller assembly 130-2 and each smartcard to allow the smartcard to advance when the rollers of roller assembly 130-2 are turned by drive motor 135. The amount of pressure may be set using tensioning springs incorporated as part of the roller assembly. In some embodiments, rather than using roller assemblies, a conveyor belt may be used to move each smartcard individually.

While each smartcard is passing through roller assemblies 130, cleaning assembly 110 may clean each smartcard. Cleaning assembly 110 may include: spray assembly 111, brush motor 112, brushes 113, air knives 114, and card dryer 115. Spray assembly 111 may spray a liquid, such as isopropyl alcohol, on one or more brushes, the contacts of the smartcard and/or, possibly, both sides of the smartcard generally. Spray assembly 111 may include one or more sprayers (which may spray the side of the smartcard having electrical contacts or both sides of the smartcard), tubing, a liquid supply 170 (e.g., a pressurized or non-pressurized container), and a liquid pump, which may be controlled by electronic control and user interface 140. Excess sprayed liquid that drips from the brushes, smartcard, and/or other components may be routed to a recapture container, indicated by liquid recovery 171. Brushes 113 may be located among rollers of roller assembly 130-1 and roller assembly 130-2 in order to brush the contacts of the smartcard and the top and bottom surfaces of the smartcard generally. Brushes 113 may include one or more brushes arranged among rollers of roller assembly 130-1 and one or more brushes arranged among rollers of roller assembly 130-2. Therefore, one or more brushes arranged among each of roller assemblies 130-1 and 130-2 may be sprayed with alcohol and used to brush both surfaces of the smartcard. Brushes 113 may be rotated by a brush motor 112 distinct from drive motor 135. In other embodiments, a single motor may be used to drive one or more of the roller assemblies 130 and brushes 113. Air knives 114 may be positioned in relation to rollers of roller assembly 130-1 and roller assembly 130-2 in order to blow and evaporate excess liquid off of rollers of roller assemblies 130. By using air knives to remove liquid from the rollers, the possibility of slippage of a smartcard along roller assemblies 130 may be decreased. Card dryer 115 may include one or more air blowers that blow air at the top and bottom of each smartcard as the smartcard passes along roller assemblies 130 prior to reaching sorting system 145. When each smartcard reaches sorting system 145, each smartcard should be nearly or fully dried to prevent any sticking together of smartcards in rejection tray 155 or output magazine 150. In other embodiments, only some of the cleaning assembly components may be present. For example, some embodiments may not include brushes 113 or brush motor 112. In other embodiments, spray assembly 111 may not be present.

Card sensors 160 (160-1, 160-2), detect movement of each smartcard along roller assemblies 130. A next smartcard may be dispensed by intake magazine 120 in response to card sensor 160-1 detecting that a previously-dispensed smartcard has advanced to a certain point along roller assemblies 130. That is, card sensor 160-1 may provide an indication that a card has reached a particular location to electronic control and user interface 140 which may, in response, cause the next smartcard to be dispensed from intake magazine 120 (e.g., via pusher plate 411 detailed in relation to FIG. 4). Card sensor 160-1 may be positioned to detect when a smartcard reaches a particular location along roller assemblies 130. Card sensor 160-1 may emit a laser or other form of light beam in order to detect when a card has passed a certain point along roller assemblies 130-1. Similarly card sensor 160-2 may monitor for the smartcard passing a second point along roller assemblies 130 and may be used as a trigger for sorting system 145.

Sorting system 145 receives each smartcard from roller assemblies 130 individually. Sorting system 145, based upon the speed at which drive motor 135 causes smartcards to advance along roller assemblies 130, may receive each smartcard a roughly fixed amount of time after the smartcard is sensed by card sensor 160-2. Electronic control and user interface 140 may trigger sorting system 145 to move the cleaned smartcard to either output magazine 150 or rejection tray 155. Sorting system 145 may direct smartcards that were successfully scanned by identifier scanner 125 to output magazine 150 and may direct smartcards that were not successfully scanned by identifier scanner 125 to rejection tray 155. In some embodiments, sorting system 145 may include an air-actuated lift trap, such that the lift trap is raised to allow rejected smartcards to fall into the rejection tray. Sorting system 145 may be triggered to direct the smartcard to the appropriate destination based on the smartcard being sensed by card sensor 160-2.

Output magazine 150 may receive each cleaned and successfully scanned smartcard from sorting system 145. Each received smartcard may be loaded onto a top of a stack of cleaned and successfully scanned smartcards within output magazine 150. The vertical position of output magazine 150 may be adjusted down as each cleaned smartcard is added to output magazine 150 such that each successively cleaned smartcard that was successfully scanned is added to a top of a stack of smartcards within output magazine 150. Based on the identifier successfully read by identifier scanner 125, electronic control and user interface 140 can determine a thickness of the smartcard. For example, all smartcards having an identifier within a particular numerical range may be of a defined thickness. Alternatively, a database lookup of the read identifier may be performed. Electronic control and user interface 140 may then cause output magazine 150 to adjust its vertical position by the appropriate thickness to accommodate the smartcard being received. For example, smartcards may vary between 0.7 mm and 0.9 mm in thickness. In other embodiments, the thickness variation may be greater or smaller. Output magazine 150 may include a servo motor or other form of motor that can vertically adjust the position of output magazine 150. Output magazine 150 may be removably attached with housing 101. When processing is complete or stopped, output magazine may be detached from housing 101 with the cleaned and successfully read smartcards. Rejection tray 155 may receive smartcards that were cleaned but were not successfully scanned by identifier scanner 125.

Electronic control and user interface 140 may receive user input via a user input device and output information to a user via a display device. A computer system may function as electronic control and user interface 140. Electronic control and user interface 140 may allow a user to interact with system 100, such as to start and stop smartcard processing. Further, a user may be able to view identifiers of smartcards successfully scanned by identifier scanner 125. A file or database entries may be created for scanned (and, possibly un-scanned) smartcards that were received though intake magazine 120. Electronic control and user interface 140 may stop system 100 if a problem is detected. For example, if a smartcard does not pass by a card sensor of card sensors 160 (160-1, 160-2) within a predefined period of time from a previous location (e.g., passing by the previous card sensor, leaving intake magazine 120) etc., electronic control and user interface 140 may cause system 100 to stop dispensing cards from intake magazine 120 and may stop drive motor 135 and/or brush motor 112.

Additional detail regarding various embodiments of such a smartcard processing system is provided in relation to FIGS. 2-13. The embodiments of FIGS. 2-13 can represent embodiments of system 100 of FIG. 1. Various embodiments of system 100 may only include some of the components detailed in relation to system 100. For example, various embodiments may be present which do not include sorting system 145, air knives 114, and/or card sensors 160.

Figure 2:
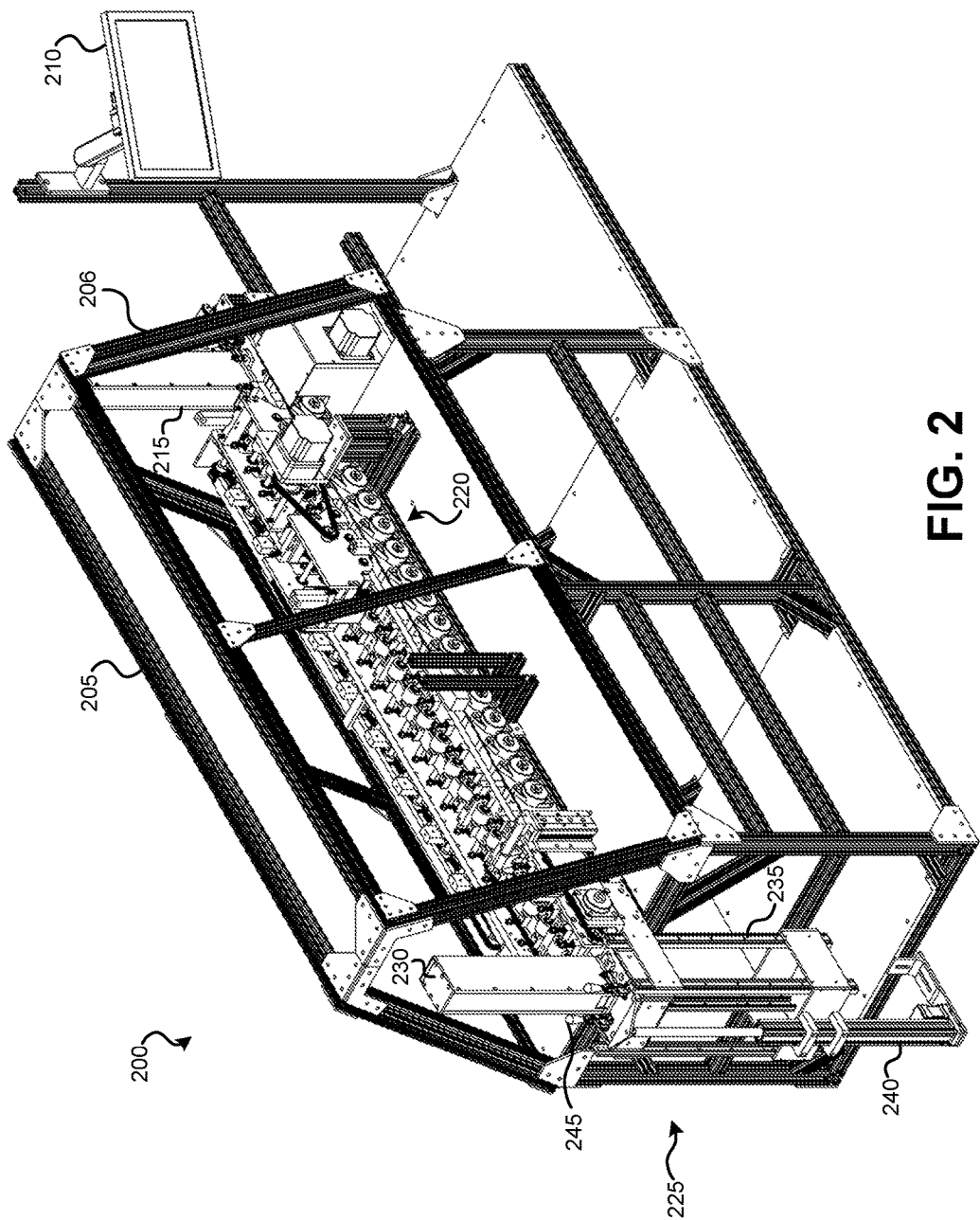
FIG. 2 illustrates an angled view of an embodiment of a smartcard cleaning and sorting system.

FIG. 2 illustrates an angled view of an embodiment of a smartcard cleaning and sorting system 200. System 200 may include the components detailed in relation to system 100 of FIG. 1. As illustrated in FIG. 2, certain components have been removed for simplicity. For instance, liquid supply 170 and liquid recovery 171 are not illustrated in FIG. 2. As part of system 200, FIG. 2 illustrates: housing 205, display 210, intake magazine 215, roller assembly 220, output assembly 225, which may include output magazine 230, output magazine rails 235, and output magazine elevator 240.

Housing 205 represents a rigid structure to which various other components of system 200 can be attached or mounted. Housing 205 may include door 206 which can be opened to access componentry of system 200. System 200 may only operate if door 206 is in the closed position. Door 206 may frame a rigid material that is transparent, such as acrylic or glass to allow a user to view functionality of components of system 200.

Display 210 may be part of electronic control and user interface 140. A user may view information and provide input to display 210 in order to control system 200. Display 210 may be configured to present data indicative of the smartcards being scanned in cleaned by system 200. Display 210 may be in communication with a computer system that is part of electronic control and user interface 140 that is not illustrated as part of FIG. 2.

Intake magazine 215 may be filled with some number of uncleaned smartcards that are to be cleaned. Such a smartcards may be cleaned one of the time along roller assembly 220. Roller assembly 220 may be supported by supports of housing 205. Integrated with roller assembly 220 may be cleaning assembly 110 that includes some or all cleaning assembly components as detailed in relation to system 100. Upon completion of cleaning, if a smartcard has been scanned successfully by an identifier scanner of system 200, the smartcard may be passed to output assembly 225. Output assembly 225 may include: output magazine 230, output magazine rails 235, and output magazine elevator 240. Output magazine 230 may store cleaned and successfully scanned smartcards. Cleaned and successfully scanned smartcards may be added to a top of a stack of smartcards in output magazine 230 by output magazine 230 being lowered along output magazine rails 235. The distance that output magazine 230 is lowered along output magazine rails 235 may be determined based on a thickness of the smartcard being inserted into output magazine 230. The electronic control and user interface may be able to determine a thickness of the smartcard based upon the identifier that has been successfully read from the smartcard. In some embodiments, rather than adjusting the position of output magazine 230 based upon a thickness of the smartcard, the height of output magazine 230 may be lowered by a set distance following each smartcard being cleaned or inserted. In other embodiments, output magazine 230 may be positioned such that as smartcards are cleaned, the smartcards may fall into output magazine 230. Output magazine elevator 240 may adjust the vertical position of output magazine 230 along output magazine rails 235. A control motor of output magazine elevator 240 may be in communication with the electronic control and user interface of system 200.

When output magazine 230 is to be emptied of cleaned and successfully scanned smartcards, one or more latches, such as latch 245 may be disengaged such that output magazine 230 may be detached from system 200. Output magazine 230 may then be emptied of the cleaned and successfully scanned smartcards. Output magazine 230 may then be re-coupled with system 200 and latched using one or more latches such as latch 245.

Figure 3:
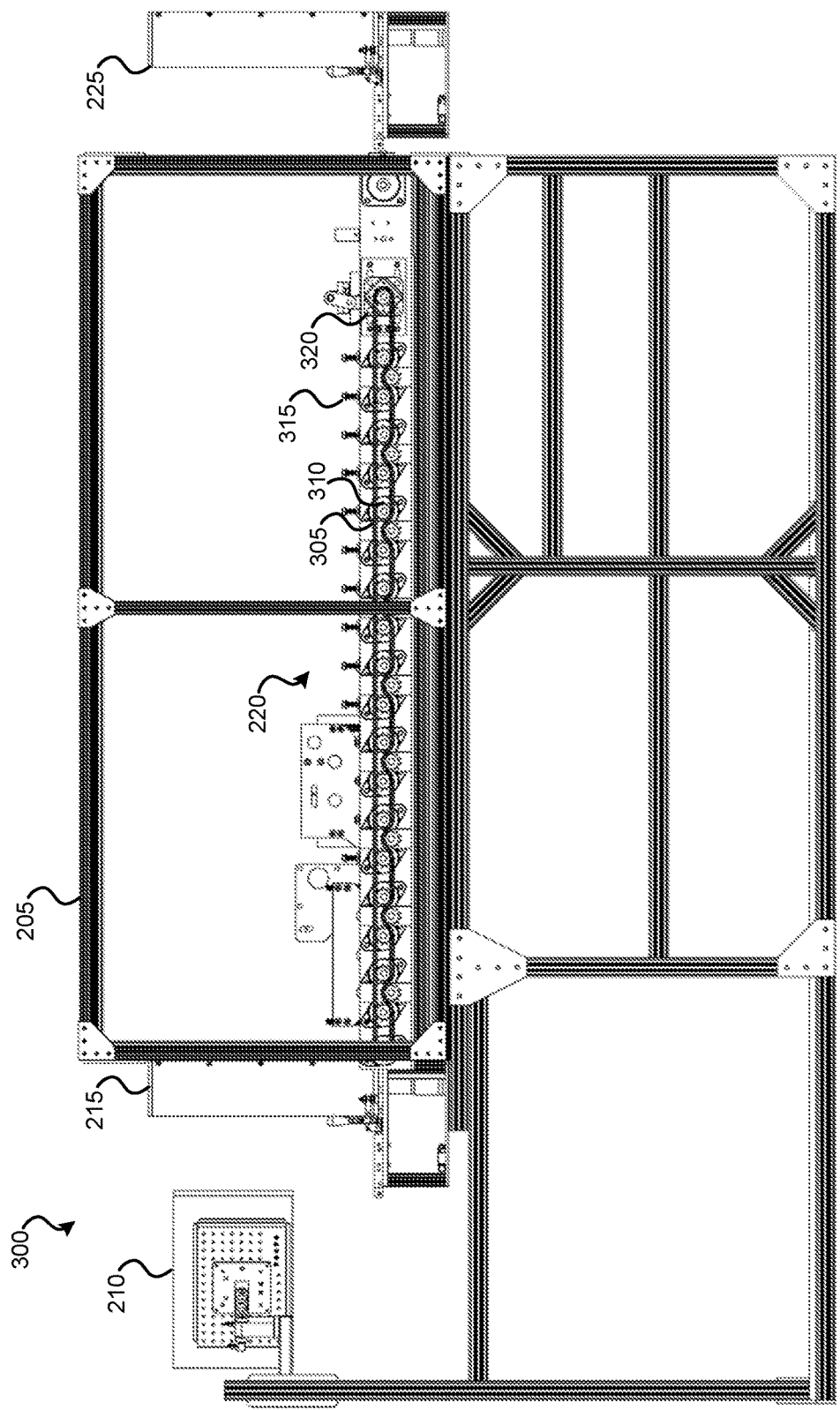
FIG. 3 illustrates a rear view of an embodiment of a smartcard cleaning and sorting system.

FIG. 3 illustrates a rear view of an embodiment of a smartcard cleaning and sorting system 300. System 300 can represent an embodiment of system 100 and/or system 200. In system 300, roller assembly chain drive 305, roller assembly drive gears (such as roller assembly drive gear 310), and roller assembly tensioning screws (such as roller assembly tensioning screw 315) are visible. Roller assembly chain drive 305 connects various rollers of the roller assembly with drive motor 320. Drive motor 320 may be controlled using an electronic control and user interface of system 300. Drive motor 320 may represent drive motor 135 of system 100 of FIG. 1. Each roller of the roller assembly may have an associated gear is mechanically engaged with roller assembly chain drive 305. In some embodiments, only rollers that are positioned above a smartcard travel path or below the smartcard travel path may be connected with roller assembly chain drive 305.

Roller assembly tensioning screws, such as roller assembly tensioning screw 315, may be screwed into or out of the roller assembly to increase or decrease, respectively, the amount of tension applied by the top rollers of the roller assembly to smartcards traversing the smartcard travel path. Rollers of the lower roller assembly (roller assembly 130-2) may be in a fixed position while rollers of the upper roller assembly (roller assembly 130-1) may lift a distance to accommodate a smartcard and apply pressure to the smartcard as the smartcard travels beneath such rollers of the upper roller assembly. A roller assembly tensioning screw may be present for each roller of an upper roller assembly.

Figure 4:
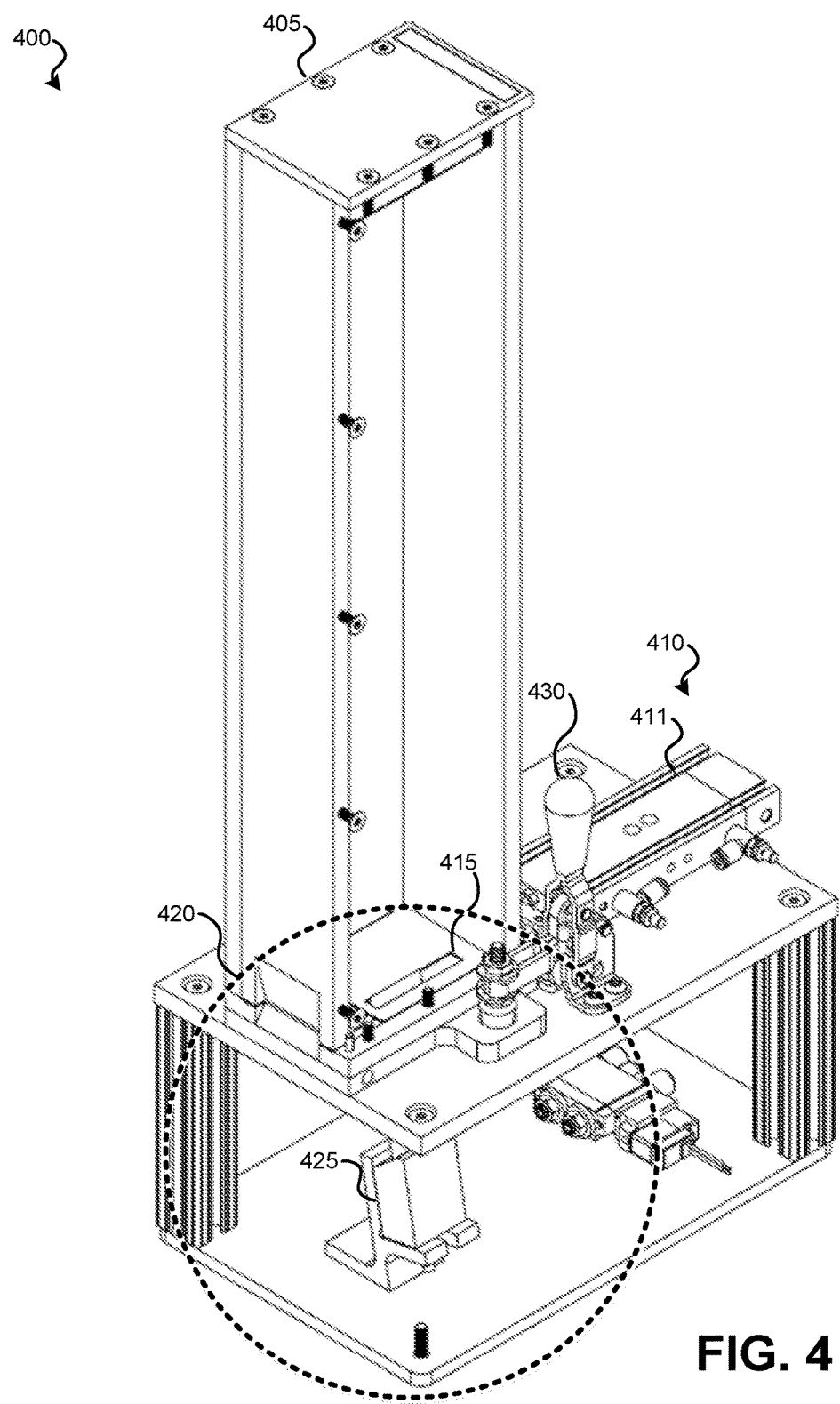
FIG. 4 illustrates an angled view of an embodiment of an intake magazine with an identifier scanner.

FIG. 4 illustrates an angled view of an embodiment 400 of an intake magazine with an identifier scanner. Embodiment 400 illustrates in intake magazine 405, which may represent intake magazine 120 of system 100 or intake magazine 215 of system 200. When some number of smartcards are present within intake magazine 405, smartcards may be dispensed from a bottom of intake magazine 405 by smartcard insertion assembly 410.

Present in the bottom of intake magazine 405 may be identifier window 415. Identifier window 415 may allow an identifier present on an exterior of the lowest smartcard within intake magazine 405 to be visible through identifier window 415 and read by identifier scanner 425. Identifier scanner 425 may be mounted to a bracket that is mounted at an angle to a portion of a housing of the smartcard cleaning and sorting system. Identifier scanner 425 may represent identifier scanner 125 of system 100. Identifier scanner may optically scan a code, such as a barcode, through identifier window 415 prior to the smartcard being pushed by smartcard insertion assembly onto roller assembly 220. The lowest smartcard in intake magazine 405 is pushed by pusher plate 411 of smartcard insertion assembly 410 into roller assembly 220. When pusher plate 411 is retracted, the next lowest smartcard present within intake magazine 215 may descend and have its identifier visible through identifier window 415. Smartcard insertion assembly 410 may include an actuator that, when engaged by an electronic control and user interface, causes pusher plate 411 to slide into intake magazine 405 and eject a lowest smartcard.

One or more latches, such as latch 430 may be used to couple and decouple intake magazine 405 with a smartcard cleaning and sorting system. When removed, intake magazine 405 may be filled with a number of smartcards to be cleaned and sorted. Intake magazine 405 may then be relaxed to the smartcard cleaning and sorting system.

Figure 5:
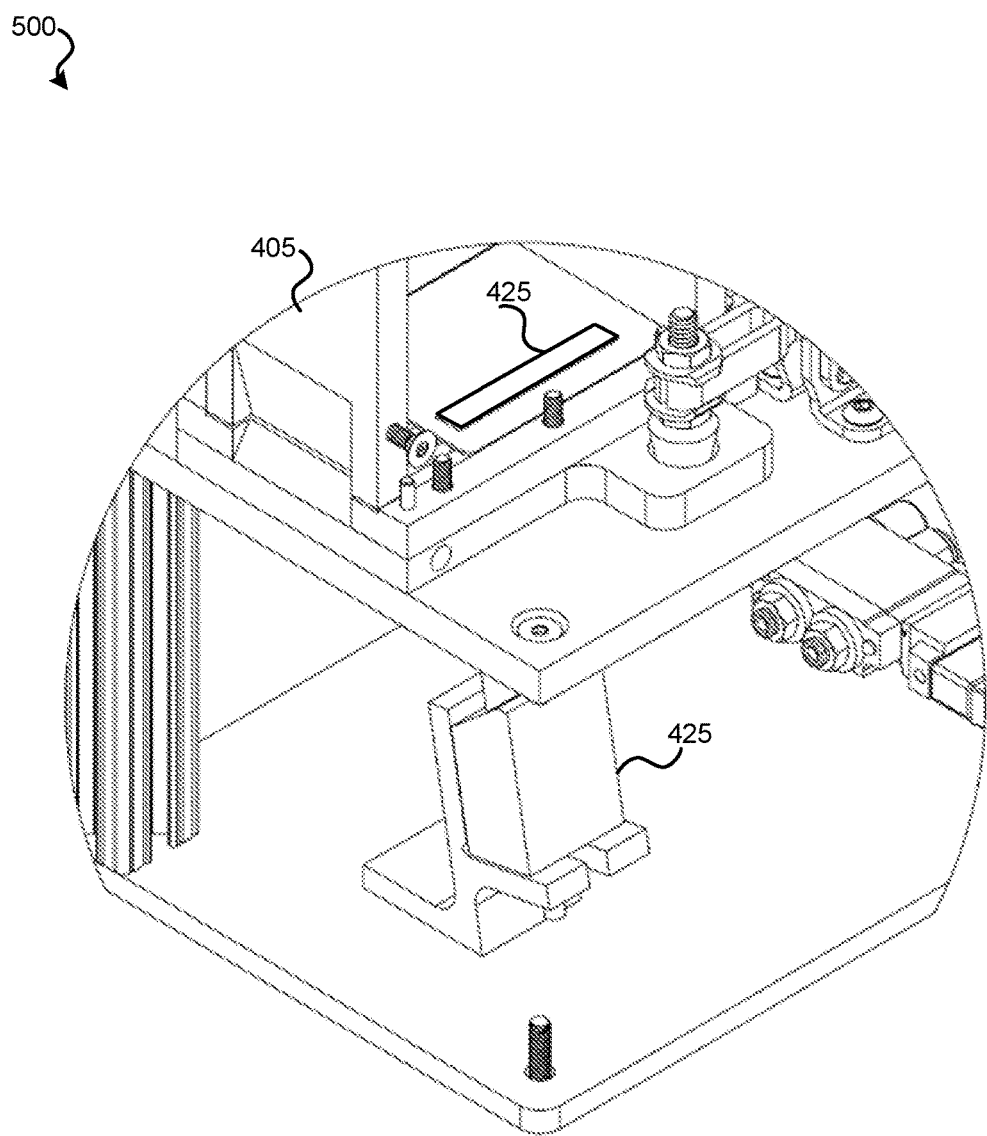
FIG. 5 illustrates an angled view of an embodiment of an identifier scanner.

FIG. 5 illustrates an angled view of an embodiment 500 of an identifier scanner. Embodiment 500 may represent view 420 of embodiment 400. Identifier scanner 425 may be positioned and angled such that it scans an identifier of a lowest smartcard within intake magazine 405.

Figure 6:
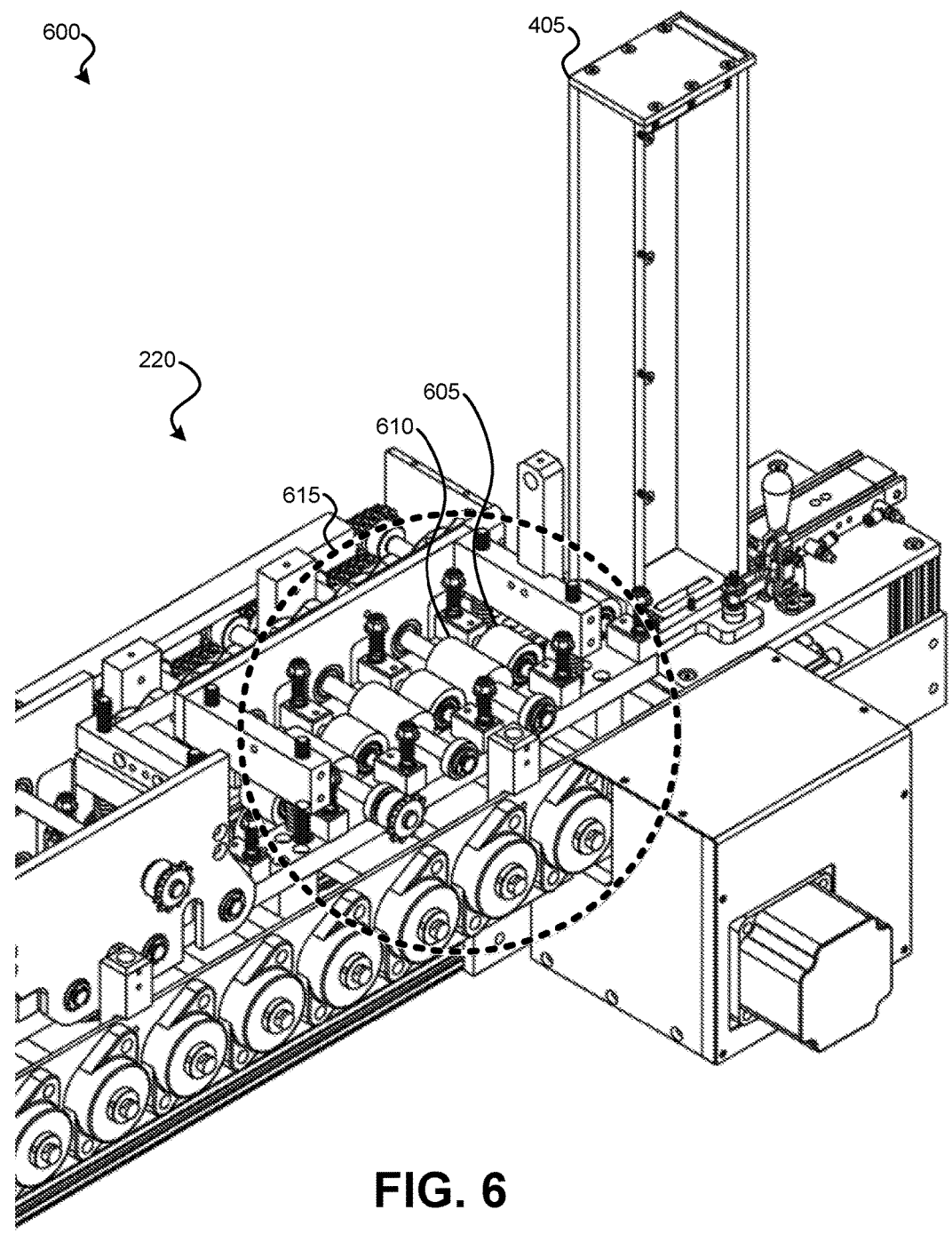
FIG. 6 illustrates an angled view of an embodiment of brushes positioned along a roller assembly of a smartcard cleaning and sorting system.

FIG. 6 illustrates an angled view of an embodiment 600 of brushes positioned along roller assembly 220 of a smartcard cleaning and sorting system. Embodiment 600 may represent a portion of smartcard cleaning and sorting system 100 and/or 200. Visible on roller assembly 220 is rollers of an upper roller assembly (e.g., roller assembly 130-1). Roller 605 represents a roller of the upper roller assembly. A smartcard may pass along a path beneath roller 605. As such, a top surface of a smartcard may contact roller 605.

Interspersed with rollers of the upper roller assembly may be one or more brushes, such as brush 610. Brushes, such as brush 610, may be connected with a drive motor that causes the brushes to rotate counterclockwise (or clockwise). Such brushes clean contacts of the smartcard and, possibly, some or all of the top surface of a smartcard passing through roller assembly 220. Such brushes may have semi-rigid or flexible bristles that are used to remove debris and grime from a top surface of smartcard. Brushes may be similarly interspersed with rollers of a lower roller assembly that clean a bottom surface of the smartcard. Such brushes may be connected with a drive motor that causes the brushes to rotate clockwise (or counterclockwise). While the top brushes may rotate counterclockwise, the bottom brushes may rotate in the opposite direction, clockwise.

Figure 7:
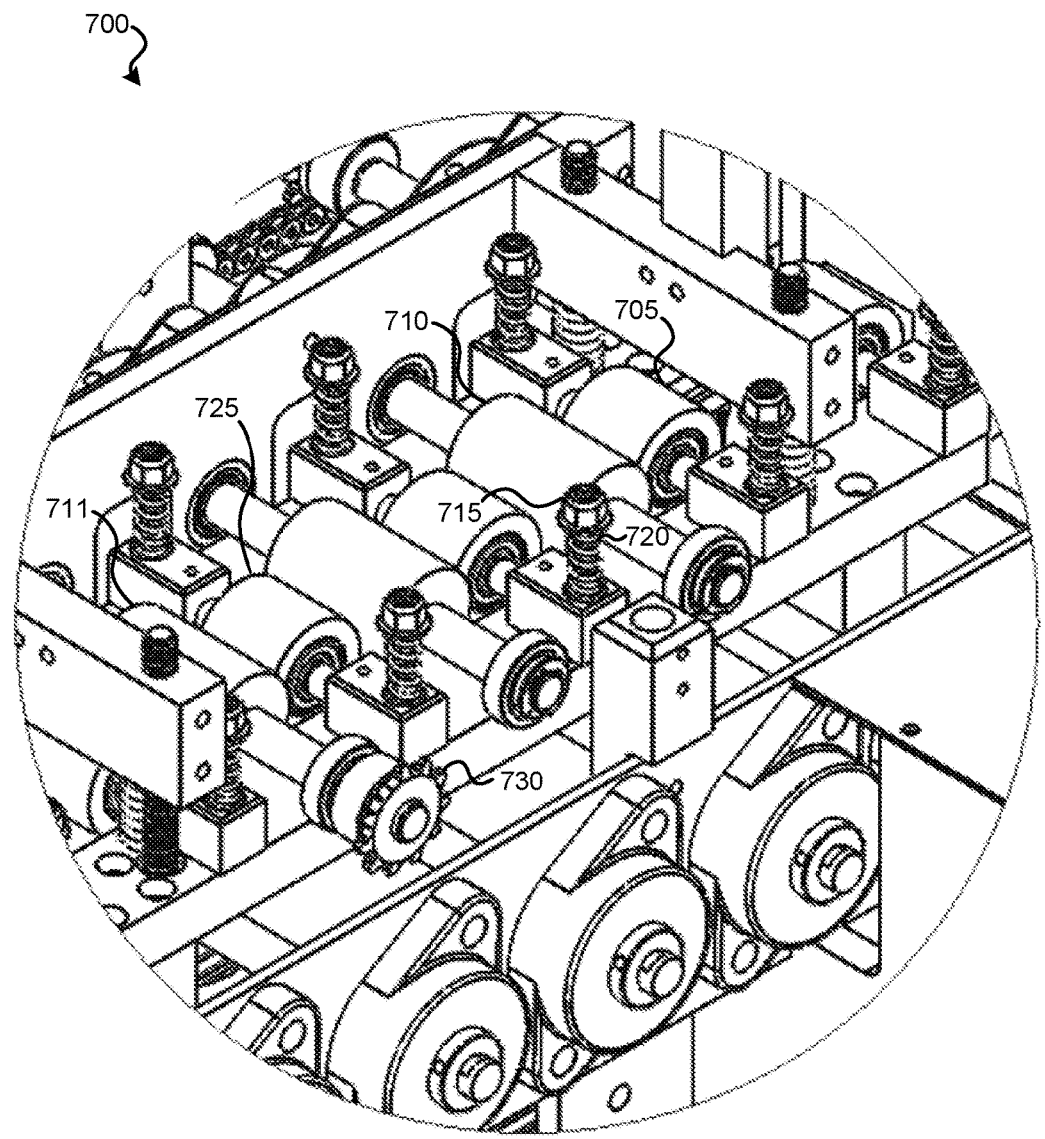
FIG. 7 illustrates an angled view of an embodiment of brushes, rollers, and tensioning screws positioned along a roller assembly.

A more detailed view of a portion of embodiment 600 of region 615 is presented in FIG. 7. FIG. 7 illustrates an angled view of an embodiment of brushes, rollers, and tensioning screws positioned along a roller assembly. In view 700 of a portion of embodiment 600, two rollers of the upper roller assembly are visible, roller 705 and roller 725. Brush 710 is located between rollers 705 and 725. Brush 711 is connected with gear 730. Gear 730 may be coupled with a chain (not illustrated in FIG. 7) that is connected with a drive motor to turn brush 711. A similar gear may be connected with the chain for brush 710 and the remaining brushes present on the upper assembly. The chain and drive motor for the upper and lower brushes may be distinct from the motor and chain drive used to advance a smartcard along roller assembly 220.

Visible in view 700 is tensioning screw 715. Tensioning screw 715, when tightened, may compress spring 720, which causes a greater amount of force to be applied to roller 725. This increases the amount of pressure applied to a smartcard passing below roller 725. Such pressure may ensure sufficient friction is present between the smartcard and a roller being turned by a drive motor (e.g., drive motor 320) such that the smartcard advances through roller assembly 220.

Figure 8:
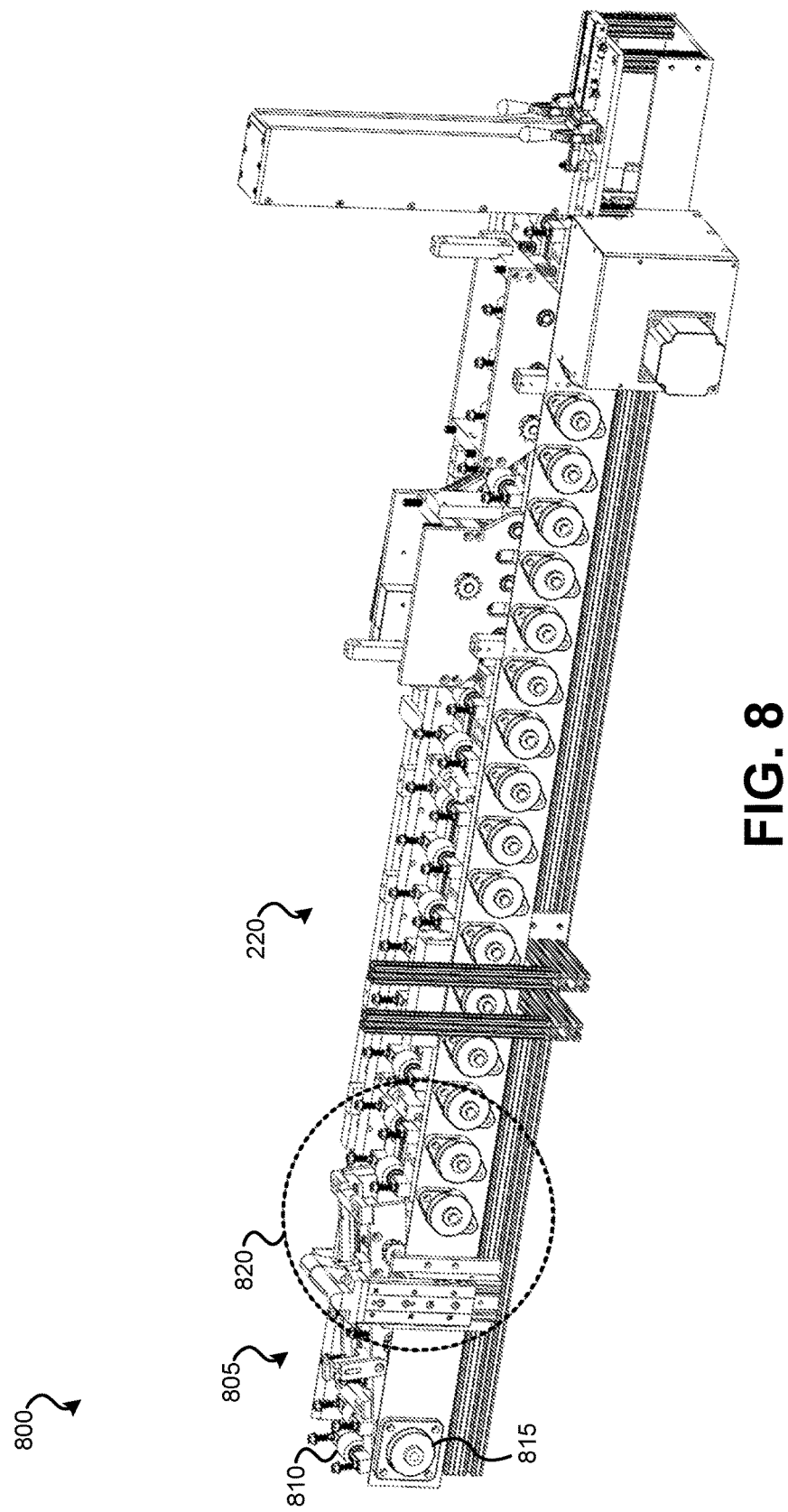
FIG. 8 illustrates an angled view of an embodiment of a roller assembly with an integrated sorting system.

FIG. 8 illustrates an angled view of an embodiment of a roller assembly 800 with an integrated sorting system. Roller assembly 800 can represent roller assembly 220 of FIG. 2. Roller assembly 800 can include sorting system 145. In this embodiment, sorting system 145 is in the form of lift trap 805. Lift trap 805 is illustrated in a raised position. When in the raised position, smartcards travelling through roller assembly 220 may fall under lift trap 805 and into rejection tray 155 located below roller assembly 220. When in a lowered position, a smartcard may travel along a smartcard travel path of lift trap 805 and continue towards an output magazine beneath roller 810. Lift trap 805 may be pivoted upwards and downwards around pivot joint 815.

Figure 9:
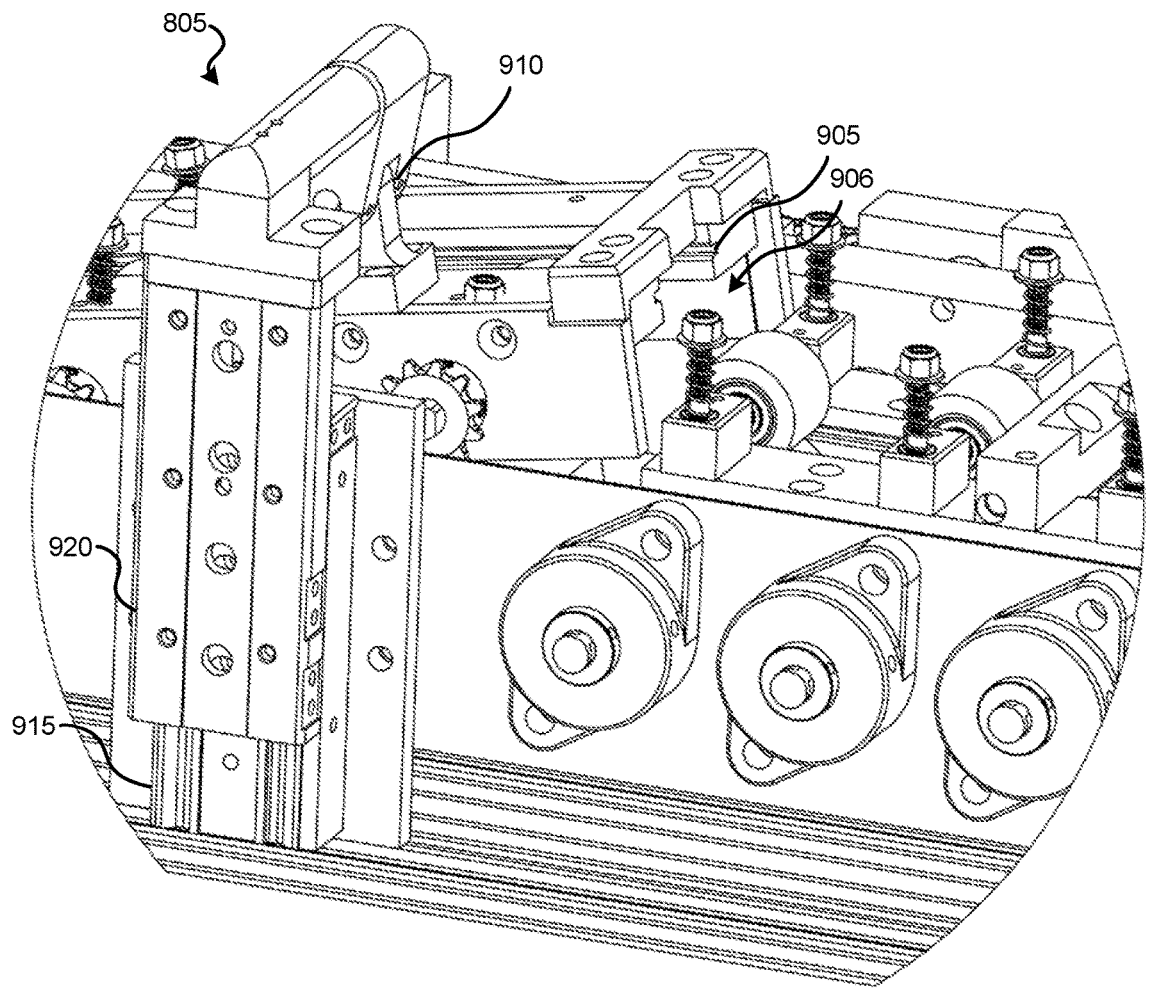
FIG. 9 illustrates an angled view of an embodiment of a lift trap.

Further detail regarding lift trap 805 is provided in relation to view 820 in FIG. 9. FIG. 9 illustrates an angled view of an embodiment of a lift trap. In FIG. 9, lift trap 805 is in the raised position such that a smartcard passing through roller assembly 220 would not pass into smartcard track 905 of lift trap 805. Rather, the smartcard would fall through gap 906 located below smartcard track 905, possibly into a rejection tray located below lift trap 805. When lift trap is in a lowered position, a smartcard traversing along roller assembly 220 would pass into smartcard track 905 and continue towards loading into an output magazine.

Lift trap 805 may be actuated between the raised position and a lowered position by slide guide 920 being slid upwards along track 915. A pneumatic cylinder may be connected with slide guide 920 to actuate slide guide 920 upward using compressed air. The pneumatic cylinder may be in communication with an electronic control and user interface of the smartcard cleaning and sorting system, which may provide a signal to the pneumatic cylinder causing it to raise and lower. Slide guide 920 may be connected with pivot 910. Pivot 910 may allow slide guide 920 to move vertically but hinges with a protrusion from smartcard track 905 to allow smartcard track 905 to be pivoted around pivot joint 815.

Figure 10:
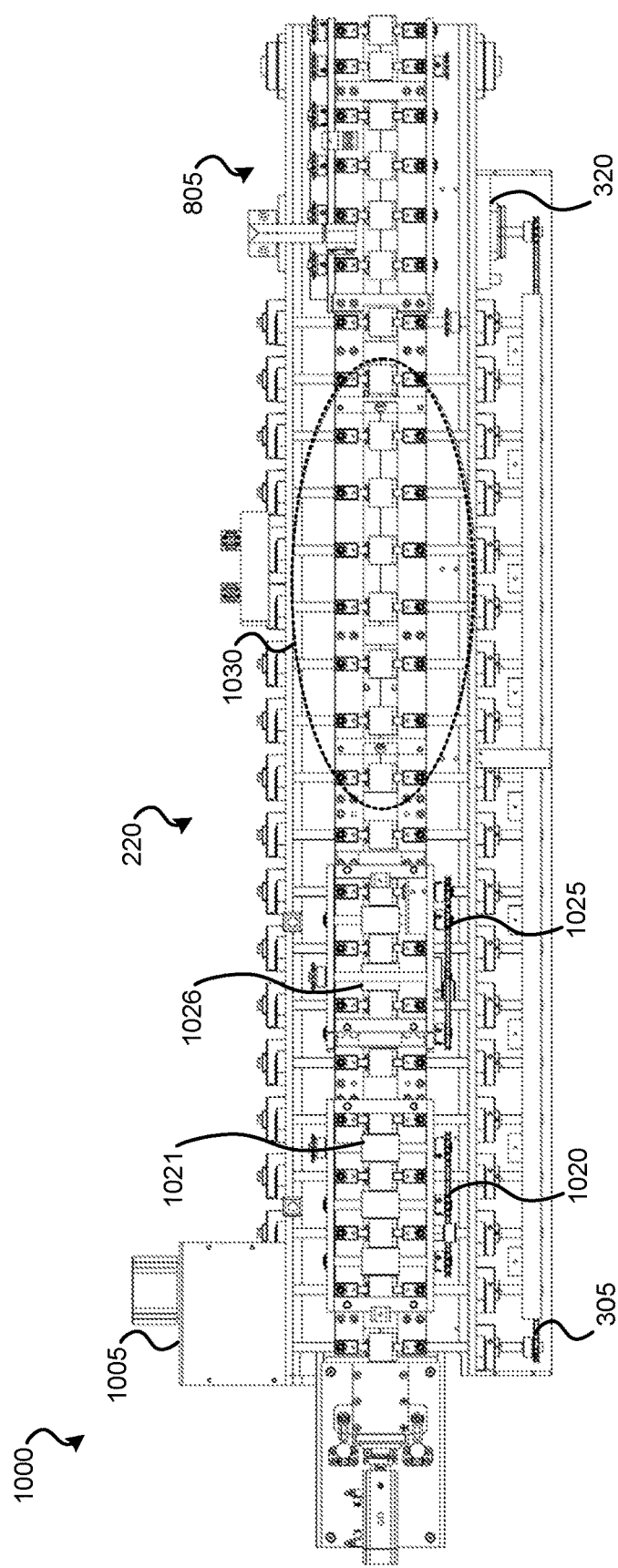
FIG. 10 illustrates an top view of an embodiment of a roller assembly with an integrated cleaning assembly.

FIG. 10 illustrates an top view of an embodiment 1000 of a roller assembly with an integrated cleaning assembly. Embodiment 1000 can represent roller assembly 220 having an integrated cleaning assembly 110. Visible in the top view is drive chain 305 and a portion of drive motor 320. Drive motor 320 drives drive chain 305 to rotate rollers of a lower roller assembly (roller assembly 130-2) and/or upper roller assembly (roller assembly 130-1). In some embodiments, a belt may be used for drive chain 305.

Additionally visible are the two chain assemblies for the upper brushes and lower brushes. Chain 1020 may be connected with brush motor 1005 that is used to rotate the brushes (e.g., brush 1021) present on a top of the roller assembly (to clean a top surface of the smartcard and/or smartcard contacts); chain 1025 may be connected with brush motor 1005 that is used to rotate the brushes (e.g., brush 1026) present on a bottom of the roller assembly (to clean a bottom surface of the smartcard and/or smartcard contacts). Brush motor 1005 may represent brush motor 112 of FIG. 1. Brush motor 1005 may be controlled by an electronic control and user interface of the smartcard cleaning and sorting system. While not illustrated in FIG. 10, spray assembly 111 may be positioned along roller assembly 220 such that a smartcard traversing through roller assembly 220 is sprayed with liquid prior to or while being brushed. Air knives, which emit high-pressure air, may be positioned to help remove liquid from rollers of roller assembly 220. Such liquid may have been inadvertently transferred to the rollers from spray assembly 111 (e.g., sprayed on a smartcard and transferred via contact to a roller). Detailed top view 1030 is presented in FIG. 11 and illustrates a portion of roller assembly 220 through which a smartcard will pass following being brushed.

Figure 11:
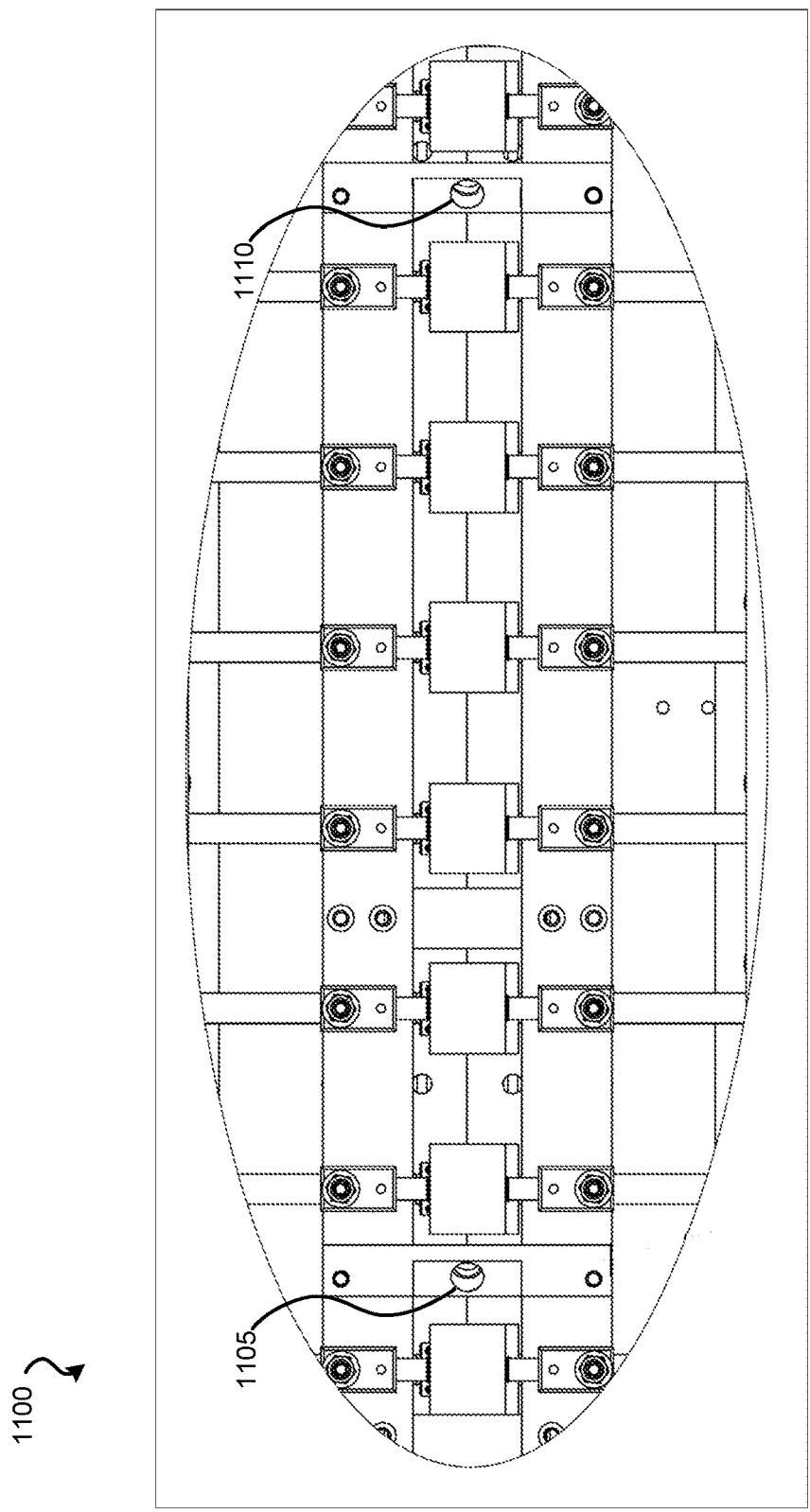
FIG. 11 illustrates a top view of an embodiment of a roller assembly with integrated card dryers.

FIG. 11 illustrates a top view 1030 of an embodiment of a roller assembly 220. Visible in top view 1030 are integrated card dryer vents. In FIG. 11, card dryer vents 1105 and 1110 are visible. Card dryer vents 1105 and 1110 are part of card dryer 115 of FIG. 1. Air may be expelled through card dryer vents 1105 and 1110 to dry a top and/or bottom surface of a smartcard passing through roller assembly 220. Such air may expedite evaporation of liquid used to clean a smartcard and may help prevent smartcards from sticking together in output magazine 150. While two card dryer vents are illustrated, it should be understood that the number of dryer vents that are positioned to direct air to the top and bottom of a smartcard passing through roller assembly 220 may vary by embodiment.

Figure 12:
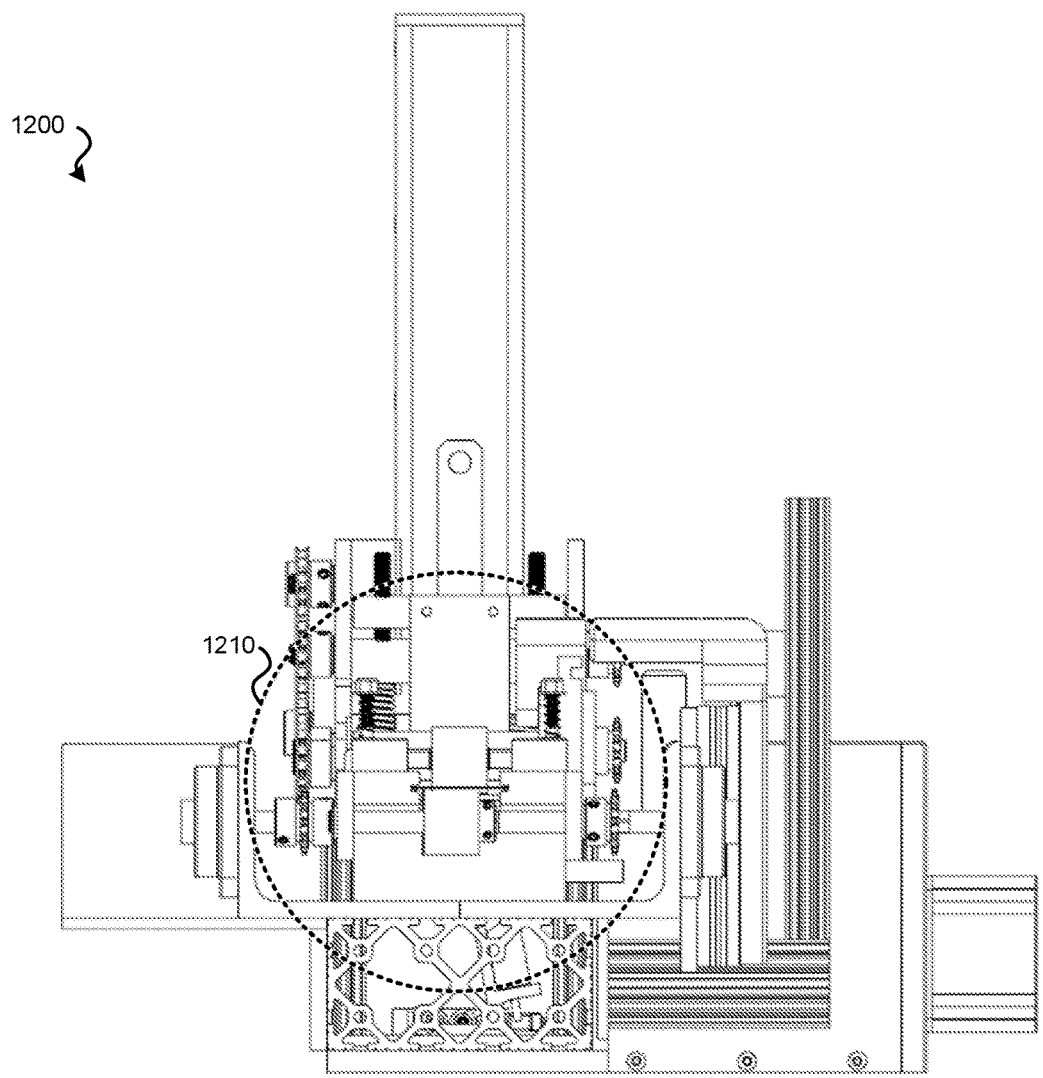
FIG. 12 illustrates an end view of an embodiment of a smartcard cleaning and sorting system.
Figure 13:
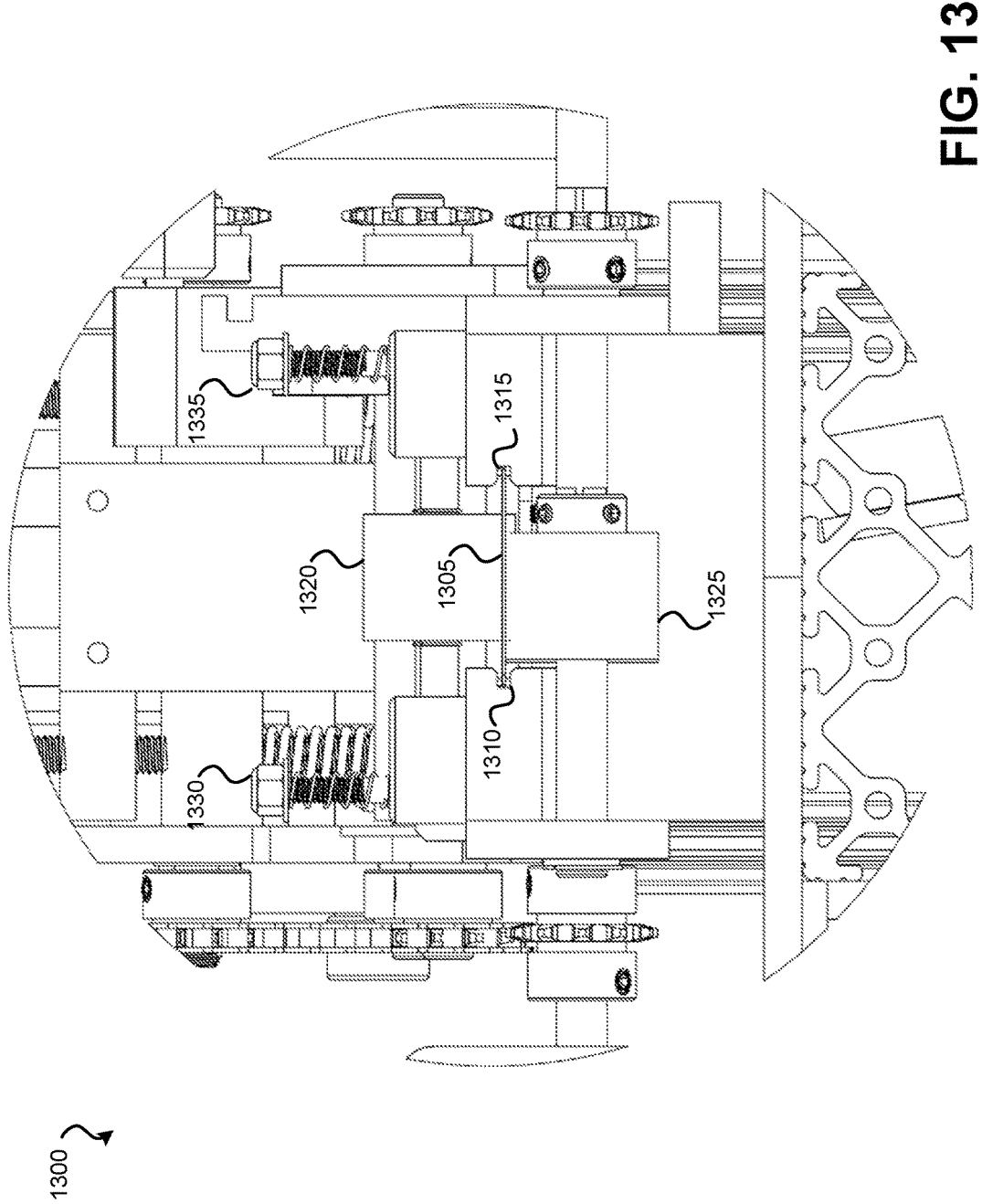
FIG. 13 illustrates an end view of an embodiment of a smartcard cleaning and sorting system.

FIG. 12 illustrates an end view of an embodiment 1200 of a smartcard cleaning and sorting system. View 1210 provides a more detailed view of the path along with a smartcard travels. FIG. 13 illustrates view 1210 of embodiment 1200. Smartcard 1305 may travel through roller assemblies, which may include slot guide 1310 and slot guide 1315. Slot guides 1310 and 1315 may provide a guided path for smartcard 1305 to travel along. Slot guides 1310 and 1315 may be notched blocks of a rigid material, such as metal. Rollers 1320 and 1325, of upper and lower roller assemblies, respectively, may be rotated to cause smartcard 1305 to travel through slot guides 1310 and 1315. Pressure may be applied by roller 1320 to smartcard 1305 to increase friction with roller 1325. The pressure applied by roller 1320 may be regulated by tension screw 1330 and tension screw 1335.

Figure 14:
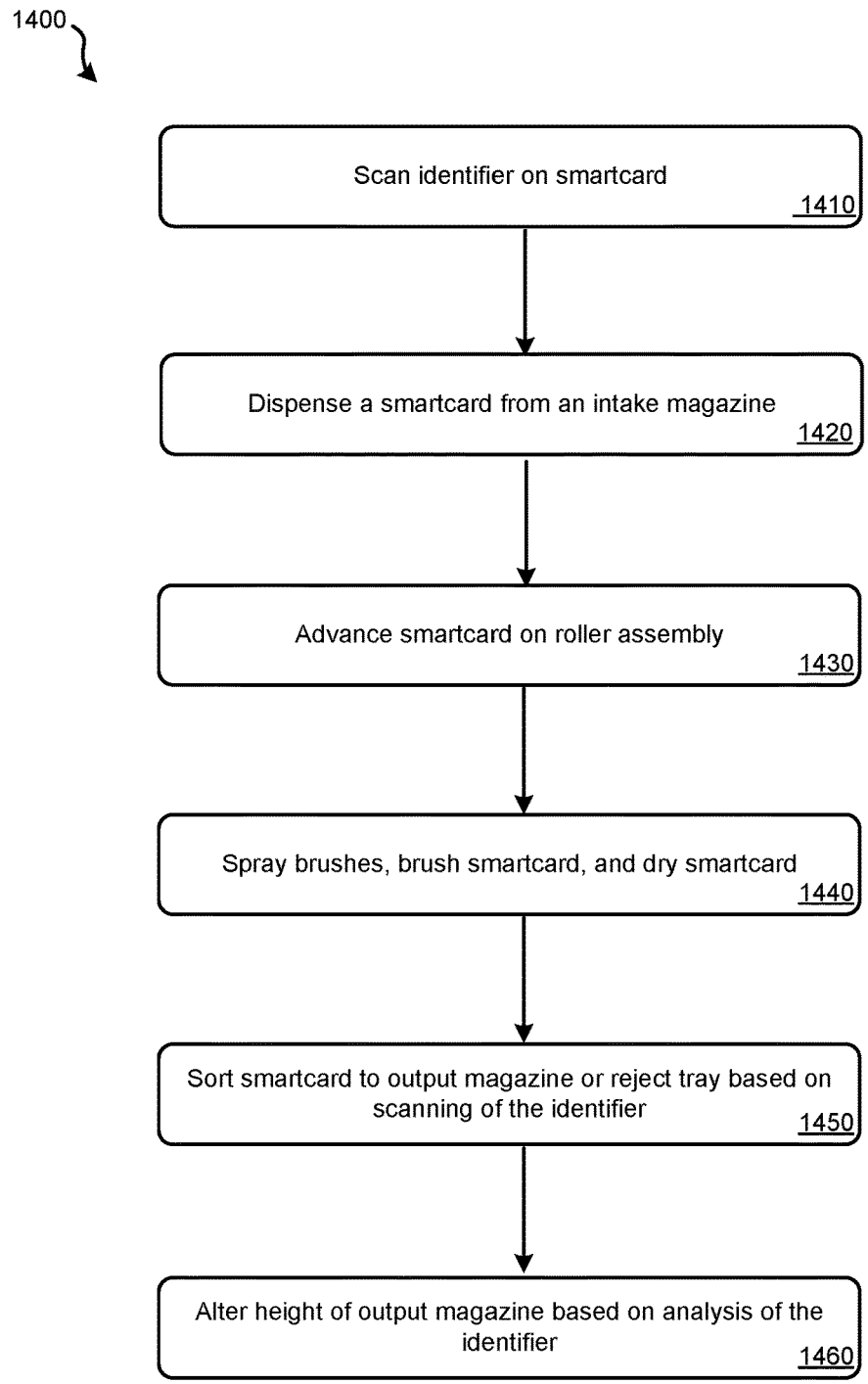
FIG. 14 illustrates a method for cleaning and sorting smartcards.

Various methods may be performing using the systems, devices, and apparatuses detailed in relation to FIGS. 1-13. FIG. 14 illustrates a method 1400 for cleaning and sorting smartcards. Each block of methods 1400 may be performed using a smartcard processing system as previously described.

At block 1410, prior to dispensing or cleaning, a smartcard may have an identifier present on its surface read. In some embodiments, this identifier is a barcode and the barcode is read by an optical barcode scanner while the smartcard is present within an intake magazine. For instance, a window on the intake magazine may be present that allows an identifier of a smartcard that is to be dispensed next to be read. In other embodiments, the identifier may be in the form of text (e.g., a serial number), a QR code, or RFID chip. The identifier may be read by an identifier scanner that is configured to read the type of machine-readable identifier present on smartcard. Regardless of whether the identifier scanner successfully reads the identifier from the smartcard, the smartcard may proceed to block 1420.

At block 1420, a smartcard may be dispensed from an intake magazine. The intake magazine may have been previously loaded with some number of smartcards (e.g., 5, 10, 20, 100, 250) to be cleaned and sorted. These smartcards may have the same thickness or may vary in thickness. The length and width of the smartcards may be approximately equal. Each smartcard may be dispensed from the intake magazine individually, such as detailed in relation to FIG. 4.

At block 1430, the smartcard may advance along a roller assembly driven by a motor. Rollers may exert pressure on the smartcard from the top and bottom and turn, moving the smartcard away from the identifier scanner and intake magazine through a cleaning assembly. In some embodiments, rather than using a roller assembly, a form of conveyor belt or other arrangement that can move a smartcard along a defined path may be used.

At block 1440, the spray assembly may be used to spray one or more brushes with liquid (e.g., alcohol, water) then brush the smartcard on its contacts and/or both sides. The cleaning assembly may then dry the smartcard by blowing air onto the contacts and/or both sides of the smartcard to remove any liquid remaining on the smartcard. Liquid may be removed from rollers using one or more air knives. It should be understood that in other embodiments, various cleaning arrangements other than sprayed liquid, brushes, and air drying may be used.

At block 1450, the smartcard may be sorted based on the scanning of the smartcard's identifier at block 1420. If the identifier was successfully read, the cleaned smartcard may be sorted to be loaded into an output magazine. If the identifier was not successfully read, a sorting system routes the cleaned smartcard into a rejection tray. The sorting system may move a tray such that the rejected cleaned smartcard drops into the rejection tray. The tray may be triggered to move based on a card sensor detecting the presence of the card at a particular location along the roller assembly.

At block 1460, the position of the output magazine may be adjusted based on the determined thickness of the smartcard. The thickness of the smartcard may be determined by an electronic control and user interface based on the identifier read from the smartcard. The identifier may specify the thickness of the smartcard. For example, identifiers that begin with a particular digit or sequence of digits may correspond to a particular thickness. In other embodiments, the electronic control may have access to a database that associates individual or ranges of identifiers with thicknesses. The output magazine's position may be adjusted to accommodate the successfully read smartcard such that the smartcard is loaded into the output magazine, such as on top of a stack of other cleaned and successfully read smartcards.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps or blocks not included in the figure. Furthermore, examples of the methods may be implemented using hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A transaction card cleaning and sorting apparatus, comprising:
   a housing;
   an uncleaned intake magazine for housing a plurality of transaction cards that dispenses each transaction card of the plurality of transaction cards individually, the uncleaned intake magazine coupled with the housing, wherein each transaction card comprises a machine-readable identifier;
   an identifier scanner attached with the housing that attempts to read the machine-readable identifier of each transaction card of the plurality of transaction cards;
   a cleaning assembly, coupled with the housing, that cleans each transaction card of the plurality of transaction cards;
   a sorting assembly, coupled with the housing, that receives the plurality of transaction cards following each transaction card of the plurality of transaction cards passing through the cleaning assembly and sorts each transaction card of the plurality of transaction cards based on whether the identifier scanner successfully read the machine-readable identifier of the transaction card; and
   a cleaned output magazine, coupled with the housing, that receives and stores at least a subset of the plurality of transaction cards received from the sorting assembly, wherein each transaction card of the at least the subset of the plurality of transaction cards had the machine-readable identifier of the transaction card successfully scanned by the identifier scanner.

2. The transaction card cleaning and sorting apparatus of claim 1, wherein each transaction card of the plurality of transaction cards is a smartcard that comprises a plurality of metallic contacts.

3. The transaction card cleaning and sorting apparatus of claim 1, wherein each transaction card of the plurality of transaction cards is a magnetic stripe transaction card that comprises a magnetic stripe.

4. The transaction card cleaning and sorting apparatus of claim 1, wherein the identifier scanner attempts to read the machine-readable identifier of each transaction card of the plurality of transaction cards prior to the transaction card being cleaned by the cleaning assembly.

5. The transaction card cleaning and sorting apparatus of claim 1, further comprising: a roller assembly comprising a plurality of rollers, wherein a first subset of the plurality of rollers contact a first side of each transaction card of the plurality of transaction cards passing through the cleaning assembly and a second subset of the plurality of rollers contact a second side of each transaction card of the plurality of transaction cards passing through the cleaning assembly.

6. The transaction card cleaning and sorting apparatus of claim 5, further comprising a drive system, wherein the drive system causes at least some of the plurality of rollers to turn to advance the plurality of transaction cards through the cleaning assembly.

7. The transaction card cleaning and sorting apparatus of claim 6, wherein the drive system further comprises a roller chain that mechanically connects the at least some of the plurality of rollers with a drive assembly.

8. The transaction card cleaning and sorting apparatus of claim 5, wherein the roller assembly further comprises a plurality of tensioning springs, wherein each tensioning spring of the plurality of tensioning springs has an adjustable tension controlling pressure of a roller of the plurality of rollers on the plurality of transaction cards as each transaction card passes through the cleaning assembly.

9. The transaction card cleaning and sorting apparatus of claim 1, wherein the cleaning assembly comprises a plurality of liquid sprays that spray liquid on one or more brushes of the cleaning assembly.

10. The transaction card cleaning and sorting apparatus of claim 1 wherein the identifier scanner is an optical scanner that attempts to read a code from each transaction card of the plurality of transaction cards selected from the group consisting of:

an alphanumeric code;
a barcode;
a QR-code; and
a color-coded symbol.

11. The transaction card cleaning and sorting apparatus of claim 10, further comprising a computerized user interface device in communication with the identifier scanner, wherein the computerized user interface device outputs indications of the machine-readable identifiers successfully scanned by the identifier scanner.

12. The transaction card cleaning and sorting apparatus of claim 1, further comprising a cleaned reject tray, coupled with the housing, that receives and stores at least a second subset of the plurality of transaction cards received from the sorting assembly, wherein each transaction card of the at least the second subset of the plurality of transaction cards had its machine-readable identifier unsuccessfully scanned by the identifier scanner.

13. A method for cleaning and sorting transaction cards, the method comprising:
scanning an identifier present on the exterior of a transaction card, wherein the identifier is a machine-readable code;
dispensing the transaction card from an intake magazine that houses a plurality of transaction cards;
after dispensing the transaction card, moving the transaction card along a cleaning assembly;
cleaning the transaction card by the cleaning assembly; and
after cleaning the transaction card, sorting the transaction card into either a cleaned output magazine or a cleaned rejection tray based on whether the scanning of the identifier was successfully performed prior to moving the transaction card along the cleaning assembly.

14. The method of claim 13, wherein each transaction card of the plurality of transaction cards is a smartcard that comprises a plurality of metallic contacts.

15. The method of claim 13, wherein each transaction card of the plurality of transaction cards is a magnetic stripe transaction card that comprises a magnetic stripe.

16. The method of claim 13, wherein scanning the identifier present on the transaction card occurs prior to cleaning the transaction card.

17. The method of claim 13, further comprising:
altering a position of the cleaned output magazine based on the transaction card being successfully scanned wherein a distance that the position of the cleaned output magazine is altered is based on the identifier of the transaction card.

18. The method of claim 13, wherein cleaning the transaction card comprises brushing both sides of the transaction card by the cleaning assembly.

19. The method of claim 13, wherein moving the transaction card through the cleaning assembly is performed by a roller assembly that is driven by a drive motor.

20. The method of claim 13, further comprising:
dispensing a second transaction card of the plurality of transaction cards from the intake magazine in response to the transaction card being sensed by a card sensor as having arrived at a particular location.

* * * * *